United States Patent [19]
Barnett et al.

[11] Patent Number: 5,878,699
[45] Date of Patent: Mar. 9, 1999

[54] PROCESS FURNACE

[75] Inventors: Daniel J. Barnett, Houston; Gregory B. Cargle, Cypress; C. Steven Lancaster, Pearland, all of Tex.

[73] Assignee: The M. W. Kellogg Company, Houston, Tex.

[21] Appl. No.: 18,859

[22] Filed: Feb. 5, 1998

[51] Int. Cl.$^6$ ...................................................... F22B 33/00
[52] U.S. Cl. ........................... 122/1 A; 110/254; 266/138
[58] Field of Search ................................ 122/1 A, 209.1; 110/251, 254, 162; 266/138, 140, 141, 155

[56] References Cited

U.S. PATENT DOCUMENTS 3,768,980   10/1973   Andersen .
5,474,280   12/1995   Martin .
5,500,034    3/1996   Martin .

OTHER PUBLICATIONS

Perry's Chemical Engineers' Handbook, Sixth Edition, pp. 9–60–9–63; (1983).

Primary Examiner—Teresa Walberg
Assistant Examiner—Gregory A. Wilson
Attorney, Agent, or Firm—The M. W. Kellogg Company

[57] ABSTRACT

A twin-cell furnace for process stream preheat and utility steam superheat. The furnace uses a pair of vertical radiant cells with top supported, bottom guided, single row, multiple pass vertical coils fired on opposite sides by floor-mounted burners. An overhead convection section is centered between the radiant cells. Induced and forced draft fans are placed over the convection section to draw combustion gas into the stack and supply air through an air preheater, between the convection section and the stack, and to the floor burners and supplemental convection section burners. Additional convection coils are positioned in the hip section between the radiant cells and the convection section. The furnace design has reduced plot space requirements, increased flexibility in heating multiple services, and allows more even heating of the radiant tubes, and easier radiant tube replacement.

15 Claims, 2 Drawing Sheets

PROCESS FURNACE

FIELD OF THE INVENTION

This invention relates to a furnace useful as a primary source of heat in a plant for preheating process streams and providing a majority of utility steam superheat, and more particularly to a multiple cell vertical tube furnace having different services in each radiant cell and a single convection section with optional supplemental firing located above the radiant cells.

BACKGROUND OF THE INVENTION

Radiant firebox configurations in prior art furnaces produced non-uniform heating of the tubes which led to an increase of the surface area required for radiant heating. Also, some arrangements in prior art furnace designs resulted in a difficult radiant tube replacement. Further, prior art furnaces with multiple services required complex controls or shutdown systems to protect furnace components during all operating conditions. In addition, burner arrangement in prior art furnaces leads to complicated combustion air duct configurations which restrict access for operation and maintenance. It would be desirable to be able to provide a furnace design with multiple cell configurations to allow for separate services in each cell, in turn allowing increased flexibility in the firing which facilitates keeping the furnace within its design limits during startups, shutdowns and emergency situations. The use of multiple firing locations would allow for increased flexibility in maintaining process and utility temperatures while allowing for better fuel utilization and efficiency. It would also be desirable to employ a minimum number of combustion air ducts to simplify the design of the combustion air control system.

U.S. Pat. No. 5,500,034 to Martin discloses a process furnace using vertical, U-shaped wicket coils with multiple side burners. Each U-shaped vertical tube has a single pass in the radiant heating section between inlet and outlet manifolds.

U.S. Pat. No. 3,768,980 to Andersen discloses a furnace with catalyst-filed vertical tubes disposed in twin radiant cells with multiple sidewall burners on either side of the tubes. An inlet manifold distributes process fluid to the tube heads from above the chamber roof through inlet pigtails, and straight pipes connect the two bases to a lower outlet manifold. In this single-pass arrangement, the long and bent pigtails are said to have been replaced by short, straight pipes which can still absorb the individual bending of the vertical reactor tubes, and all other stresses are said to have been eliminated through a suspension system attached to the tube bases.

*Perry's Chemical Engineer's Handbook*, 6th Edition, pages 9-60 through 9-63 (1984) relates the principal classification of fired heaters according to the orientation of the heating coils in the radiant section, that is, whether the coils are vertical or horizontal. Various vertical-tube fired heaters include vertical-cylindrical, all radiant; vertical-cylindrical, helical coil; vertical-cylindrical, with cross-flow-convection section; vertical-cylindrical, with integral-convection section; arbor or wicket type; and vertical-tube, single-row, double-wall fired.

As far as applicants are aware, the prior art does not disclose a process stream preheating furnace using multiple horizontally separated vertical radiant cells with a plurality of top supported, bottom guided, single row, multiple pass, vertical radiant coils fired on opposite sides by floor-mounted vertical upshot burners.

SUMMARY OF THE INVENTION

The present invention provides a multiple cell, vertical furnace having a single convection section with optional supplemental firing, located above and between the radiant cells.

In one aspect, the invention provides a furnace useful as a primary source of heat in a plant for process stream preheat and a majority of utility steam superheat. The furnace includes a plurality of horizontally separated, vertical radiant cells, a convection section located above the radiant cells and receiving combustion gas therefrom. Preferably, an induced draft fan is located above the convection section, and a forced draft fan is located above the convection section. The vertical cells each contain a plurality of top supported, bottom guided, single row, multiple pass, vertical radiant coils fired on opposite sides by floor-mounted vertical upshot burners. The forced draft fan supplies air through an air preheater, preferably located between the convection section and the stack, and then to the burners. The induced draft fan draws combustion gas through the furnace, exhausting into a stack.

In a preferred embodiment, there are two radiant cells in the furnace, and the convection section above the radiant cells is centered between the two cells. The furnace preferably includes a hip section between the radiant cells and the convection section. Supplemental burners can be located beneath the convection section to provide supplemental heat to the convection section.

Ducts can be included for passing combustion air from the forced draft fan to the air preheater, and then to the floor-mounted burners and the supplemental burners.

The radiant coils are preferably top supported and have inlets and outlets at the top of the radiant cells to allow unrestricted downward thermal growth of the radiant coils. The convection section can be foreshortened to increase flue gas velocity in the convection section.

Using the furnace of the present invention, the installed cost is reduced when compared to other designs. Locating the air preheater and the forced and induced draft fans with their drivers in the furnace structure above the convection section, instead of at grade, reduces the plot space requirements of the furnace. The use of the air preheater allows for increased heat recovery, and reduces the fuel consumption. With offset of the radiant coil inlet and outlet manifolds, and use of a foreshortened convection section, the furnace radiant coil replacement is simplified through creation of an unobstructed lane above the upper end of the radiant box.

The double fired radiant coils allow for high average flux rates, reducing the required radiant surface area and providing for a more even heating of the tubes in the radiant section. The double fired design also permits higher process fluid outlet temperatures for a given tube design, in contrast to a single fired design.

Separate services can be provided in each of the radiant cells, with a resulting enhancement of flexibility in the firing which allows the furnace operators to keep the furnace within design limits during startups, shutdowns and other emergency situations. Multiple firing locations in each radiant cell and in the convection section allow for increased flexibility in maintaining process and utility temperatures while allowing for better fuel utilization and efficiency. A minimum number of combustion air ducts simplifies the design of the combustion control system when compared to some prior art designs.

DETAILED DESCRIPTION OF INVENTION

Figure 1:
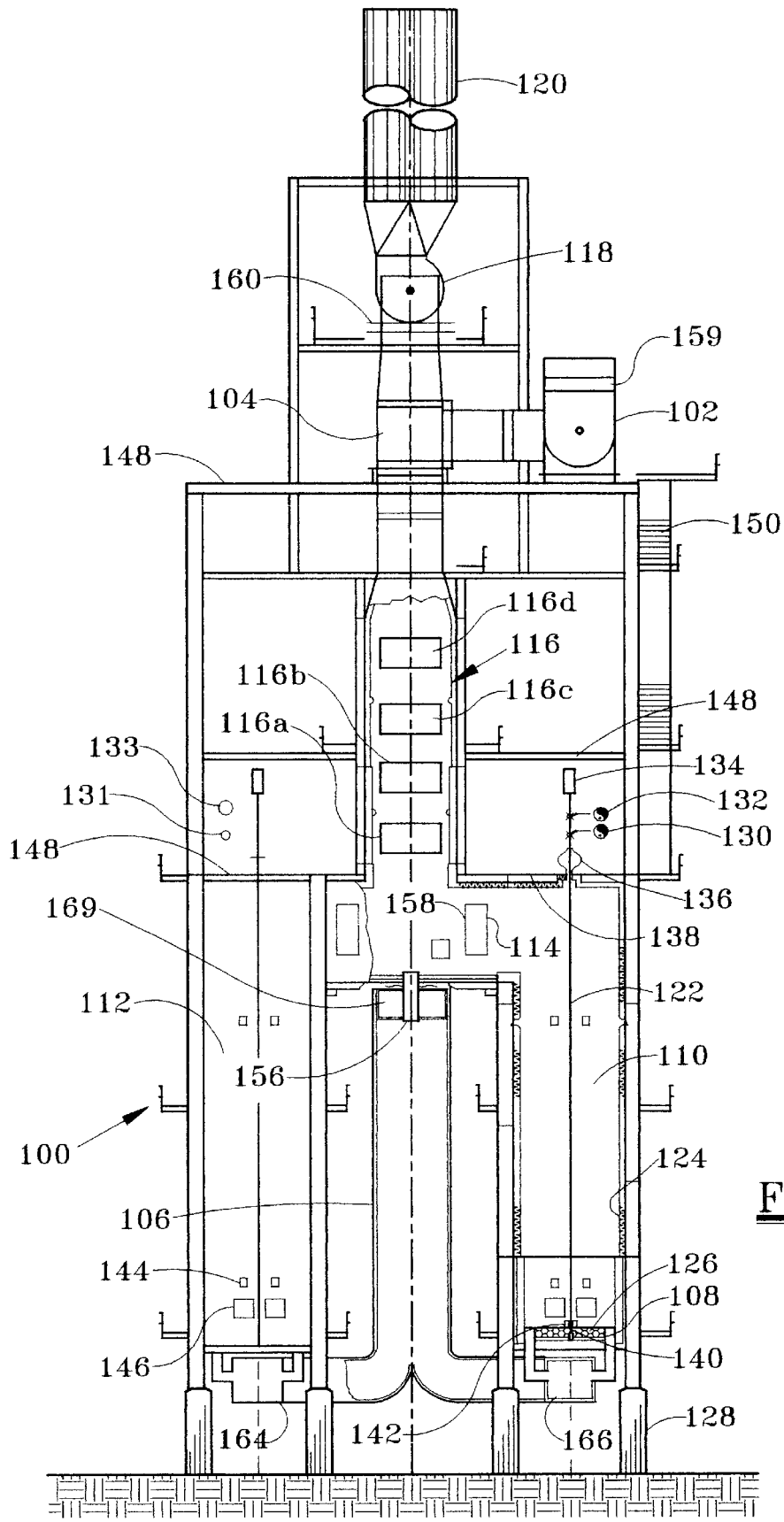
FIG. 1 is an end elevation, partially cut away, of a furnace according to the present invention.
Figure 2:
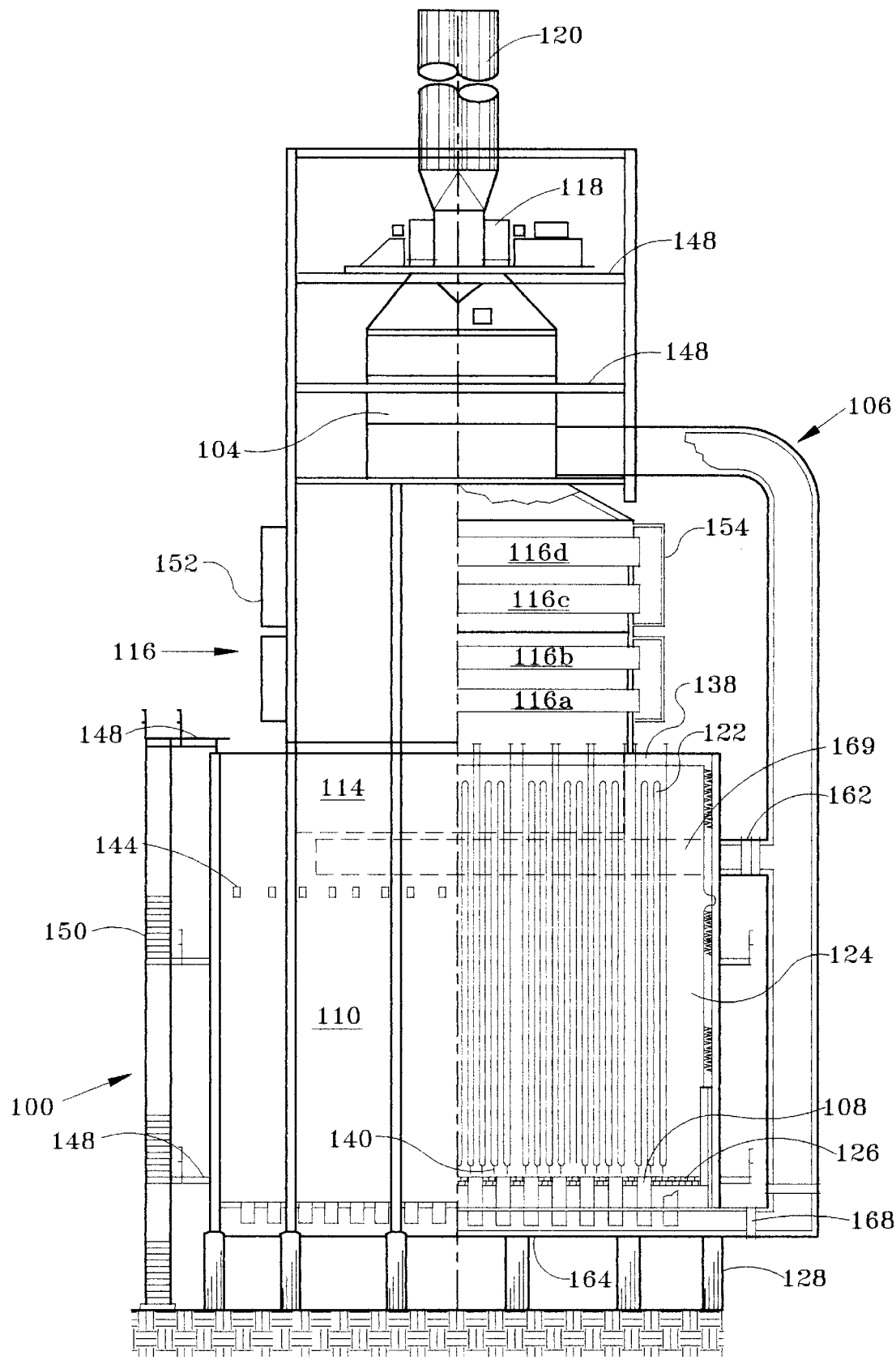
FIG. 2 is a side elevation, partially cut away, of the furnace of Fig.1.

With reference to FIGS. 1 and 2, combustion air is supplied to furnace 100 by forced draft fan 102 (see FIG.1) via air preheater 104 and duct 106 to burners 108. Flue gas passes through the furnace 100 from the burners 108 via radiant cells 110, 112, hip section 114, convection section 116, air preheater 104, induced draft fan 118, and stack 120.

Radiant cells 110 and 112 are provided on either side of the base of the furnace 100, preferably spaced horizontally apart from each other (see FIG. 1). If desired, additional radiant cells (not shown) can be provided. Each radiant cell 110, 112 contains a plurality of single row, multiple pass radiant coils 122 fired on either side thereof by floor mounted burners 108 firing upwards along the sidewalls 124. The floor 126 is supported over a base which can comprise a plurality of concrete piers 128.

Each radiant coil 122 consists of multiple serpentine passes located along the centerline of the radiant cells 110, 112 between the burners 108. As seen in FIG. 1, the coils 122 are top-supported and are connected to inlet manifolds 130,131 and outlet manifolds 132,133 running horizontally offset from the centerline above each of the radiant cells 110,112. Variable support springs 134 and penetration boots 136 are used at the top of the arch 138 to support the coils 122.

A guide pin 140 is attached at the lowermost end of each bend in the coils 122 and extends downwardly into a respective expansion sleeve 142 positioned in the floor 126 along the centerline of the respective radiant cell 110, 112. The expansion sleeve 142 is attached to the structural base of the floor 126. Except for the guide pins 140, the coils 122 are spaced vertically above the floor 126 to allow for thermal expansion of the coils 122, while the interengagement of the guide pins 140 and expansion sleeves 142 maintains horizontal alignment of the coils 122 along the centerline. This arrangement of the coil inlets and outlets at the top allows for unrestricted downward thermal growth of the coil 122, minimizing the chance of deformation. The design is flexible enough that it is not necessary that each cell 110, 112 have the same tube size or service as the other.

The sidewalls 124 and floor 126, as well as the walls of the convection section 116, hip sections 114, hot combustion air ducts 106, stack 120, and the like, are conventionally lined with insulation materials well known to those in the art, such as, for example, firebrick, silica block, ceramic fiber blanket, castable, etc. The materials are generally selected to meet the temperatures expected during operation of the furnace 100. The firebrick typically used on the floor 126 can be prefabricated to accommodate the burners 108 and expansion sleeves 142. The sidewalls 124 can be structurally reinforced with conventional stiffeners (not shown), as well as the convection section 116, hip sections 114 and ducts 106. The structure of the furnace 100 can be conventionally reinforced with diagonal bracing (not shown) for wind bracing.

The radiant cells 110, 112 can include conventional peep sights 144 and access doors 146. Platforms 148 can be provided at various levels around each cell 110, 112 with stairs 150 for access to the peep sights 144 and access doors 146. If desired, the radiant cells 110, 112 can be installed as a plurality of prefabricated modules which are secured together in place in the structure of the furnace 100.

The convection section 116 is located on top of and between the two radiant cells 110, 112. In order to increase the flue gas velocities and reduce capital cost, the convection section 116 can be foreshortened, meaning that it is horizontally shorter than the radiant boxes 110, 112, as best seen in FIG. 2. The convection section 116 is preferably less than 40 feet long, whereas the radiant cells 110, 112 are preferably greater than 40 feet in length, for example, 38 feet and 50 feet, respectively. The increased flue gas velocity aids heat transfer by increasing the outside heat transfer coefficients for the tubes in the convection section 116. The foreshortened length of the convection section 116 also leaves open spaces above either end of the radiant cells 110, 112 to facilitate removal and replacement of the coils 122. A full length convection section 116 can also be used, since this will work for this design, however, the capital cost will increase some, the heat transfer efficiency may not be as good, and access for radiant tube replacement may be more restricted.

The convection section 116 includes convection coils 116a, 116b, 116c, 116d which are provided for heating various process and utility streams. For example, coils 116a and 116b can be used to superheat high pressure steam, and coils 116c and 116d, operating at a lower temperature, to preheat process feed streams prior to heating the radiant cells 110, 112. Additional or fewer coils can be employed in the convection section 116, as desired.

The convection section 116 is preferably installed as one or more prefabricated modules. For example, coils 116a and 116b are illustrated in FIGS. 1–2 as one module, and coils 116c and 116d as another. The modules facilitate construction of the furnace 100. Each module preferably includes a terminal end 152 and a tube removal end 154. Generally, fluids to be heated in the coils 116a–d are supplied and returned at the terminal end 152, while end 154 is usually accessed only for the purposes of maintenance of the convection section 116 and/or tube service on the convection coils 116a–d.

Optional burners 156 located directly underneath the vertical convection section 116 provide supplemental firing for maintaining the steam superheat temperature. Optional convection coils 158 can also be installed in the hip section 114 (between the radiant cells 110, 112 and the vertical convection bank 116). The coils 158 help to reduce the gas temperature prior to supplemental burners 156, allowing a more economical design for the coil 116a in the convection section 116.

The air preheater 104, forced draft fan 102, and induced draft fan 118 are located above the convection section 116 in the furnace structure. The forced draft fan 102 supplies air to the air preheater 104, and then to the ducts, 106 which supply preheated air to the radiant section burners 108 and the supplemental burners 156 (see FIG. 1). A damper 159 is provided to adjust the volume of air supplied by the forced draft fan 102. The induced draft fan 118 pulls combustion gas from the convection section 116 and discharges it into the stack 120. A damper 160 (see FIG. 1) is provided to adjust the volume of flue gas drawn by the induced draft fan 118 and thereby control the operating pressure in the firebox. The ducts 106 are appropriately sized and insulated for the anticipated volume and temperature of combustion air. The combustion air supplied via duct 169 to supplemental burners 156 is controlled by damper 162 (see FIG. 2). The combustion air supplied via ducts 164, 166 (see FIG. 1) to burners 108 is likewise controlled by dampers 168 (see FIG. 2). The ducts 164, 166, 169 can be tapered in cross-sectional area from the respective inlet from duct 106 to the opposite terminal end to maintain velocity of the combustion air as it feeds the burners 108, 156. Fuel is supplied to the burners 108, supplemental burners 156 and pilot systems (not shown) via conventional fuel header systems (not shown). Conventional fuels supplied to the burners 108, 156 include natural gas, fuel oil, or the like.

The present furnace has particular advantage when used in the front end of a synthesis gas based plant for methanol or ammonia or in a hydrogen plant. In a methanol, hydrogen or synthesis gas plant, one cell would heat a mixture of hydrocarbon and steam and the other cell would heat utility steam. In an ammonia plant, one cell heats a mixture of hydrocarbon and steam and the other cell heats a mixture of steam and air.

Various modifications will be obvious to the skilled artisan in view of the above disclosure of the preferred embodiments. Such modifications which do not depart from the spirit of the invention are intended to be covered by the following claims.

We claim:

1. A furnace useful as a primary source of heat in a plant for process stream preheat and a majority of utility steam superheat comprising:

a plurality of horizontally spaced apart, vertical radiant cells, each having a different service and containing a plurality of top supported, bottom guided, single row, multiple pass vertical radiant coils fired on opposite sides by floor mounted burners;

a convention section elevated above the radiant cells and receiving flue gas therefrom;

an induced draft fan for drawing flue gas from the convection section into a stack;

a forced draft fan for supplying air through an air preheater and then to the burners; and convection coils in a hip section between the radiant cells and the convection section.

2. The furnace of claim 1 wherein the induced draft fan and the forced draft fan are elevated above the convection section.

3. The furnace of claim 1 wherein the air preheater is located between the convection section and the stack.

4. The furnace of claim 1 further comprising supplemental burners located beneath the convection section for providing supplemental firing of the convection section.

5. The furnace of claim 4 including ducts from the forced draft fan to the air preheater and then to the floor mounted burners and the supplemental burners.

6. The furnace of claim 1 wherein the radiant coils have inlets and outlets at the top of the radiant cells to allow unrestricted downward thermal growth of the radiant coils.

7. The furnace of claim 1 wherein the convection section is foreshortened.

8. The furnace of claim 1 comprising a pair of said radiant cells in a twin-cell configuration wherein the convection section above the radiant cells is centered between the radiant cells.

9. A furnace useful as a primary source of heat in a plant for process stream preheat and a majority of utility steam superheat comprising:

a pair of horizontally spaced apart, vertical radiant cells each having a separate service and containing a plurality of top supported, bottom guided, single row, multiple pass vertical radiant coils fired on opposite sides by floor-mounted burners, wherein the radiant coils each have an inlet and outlet at the top of the radiant cells to allow unrestricted downward thermal growth of the radiant coils;

a convection section located on top of and centered between the radiant cells to receive combustion gas therefrom;

an induced draft fan elevated above the convection section for drawing combustion gas from the convection section into a stack;

a forced draft fan elevated above the convection section for supplying air through a duct to an air preheater located between the convection section and the stack, and then through ducts to the burners;

convection coils in a hip section between the radiant cells and the convection section.

10. The furnace of claim 9 further comprising supplemental burners located beneath the convection section for providing supplemental firing of the convection section.

11. The furnace of claim 9 wherein the convection section is foreshortened.

12. The furnace of claim 10 wherein the convection section is foreshortened.

13. The furnace of claim 12 wherein the foreshortening of the convection section creates a lane above the radiant cells for removal of the coils.

14. The furnace of claim 9 installed in a front end of a methanol, hydrogen or synthesis gas plant wherein one of the radiant cells has a hydrocarbon feedstock service and the other radiant cell has a steam superheat service.

15. The furnace of claim 9 installed in a front end of an ammonia plant wherein one of the radiant cells has a mixed hydrocarbon and steam service and the other radiant cell has a mixed steam and air service.

\* \* \* \* \*